United States Patent [19]

Nethery

[11] 4,020,794

[45] May 3, 1977

[54] PORTABLE ANIMAL FEEDING STATION

[76] Inventor: Verlin Nethery, 2501 Glen Springs Way, Austin, Tex. 78741

[22] Filed: Aug. 27, 1975

[21] Appl. No.: 608,143

[52] U.S. Cl. .................................. 119/58; 119/60
[51] Int. Cl.² ..................... A01K 5/00; A01K 5/01
[58] Field of Search .............. 119/58, 60, 51 R, 54

[56] References Cited

UNITED STATES PATENTS

| 68,320 | 8/1867 | Stapleton | 119/60 |
|---|---|---|---|
| 2,686,494 | 8/1954 | Garman | 119/58 |
| 3,063,416 | 11/1962 | Elstner | 119/58 X |
| 3,620,192 | 11/1971 | Taylor et al. | 119/54 |
| 3,851,624 | 12/1974 | Peak | 119/60 |

*Primary Examiner*—Hugh R. Chamblee
*Attorney, Agent, or Firm*—Lee G. Meyer

[57] ABSTRACT

Disclosed is a novel, portable, animal feeding station which provides livestock, at virtually any desired location, waste-free access to fibrous feed material in quantities heretofore unobtainable with a portable unit. Compacted fibrous feed is charged into a rectangular-shaped, variable volume hopper formed by a pair of upstanding stationary, spaced-apart, opposing end walls and a pair of movably suspended mesh-covered side panels. The side panels are movably suspended on sloping tracks mounted interior the end walls such that the panels are positioned by gravity against the confined feed mass. Feeding livestock are able to grasp the fibrous feed through the mesh according to their need, and in doing so forcibly urge the panel, along the sloping tracks, against the remaining feed mass. Thus, the livestock have continuous limited access to the outer wall of the feed mass, until the mass is depleted; but are unable to obtained unrestricted access to the feed which would enable the animals to scatter and waste it.

10 Claims, 6 Drawing Figures

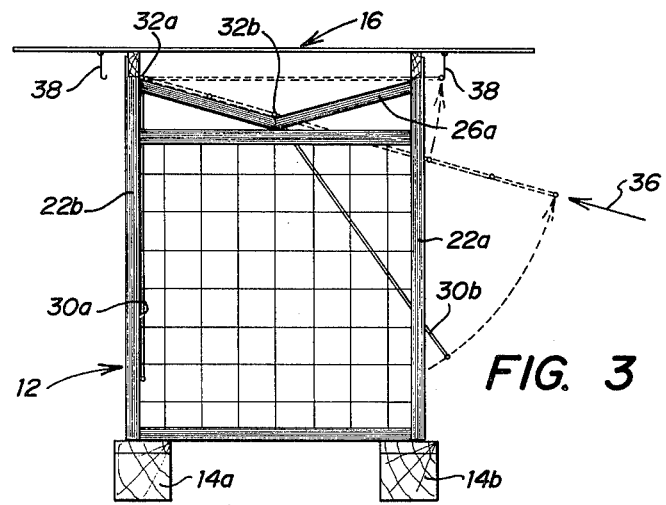
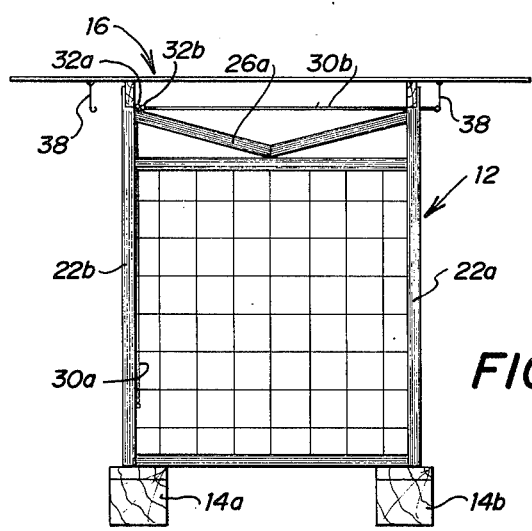
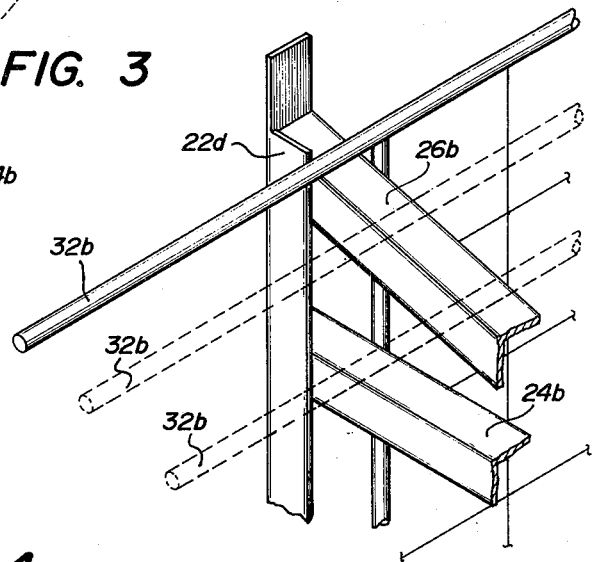
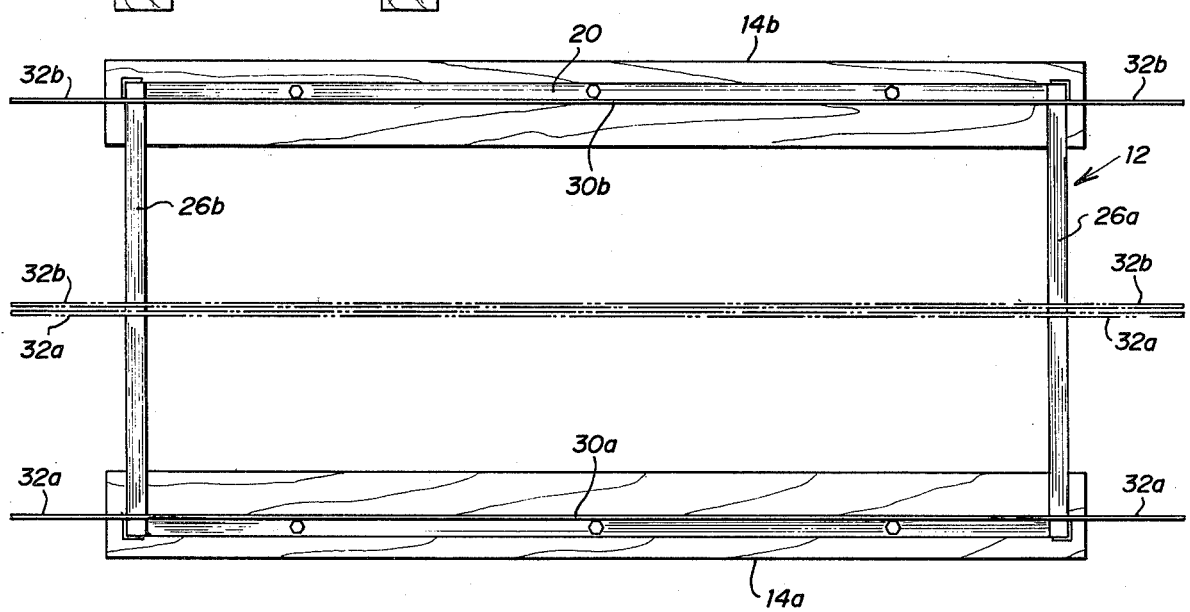
FIG. 3
FIG. 4
FIG. 5
FIG. 6

PORTABLE ANIMAL FEEDING STATION

BACKGROUND OF THE INVENTION

1. Field of the Invention

This invention pertains to animal feeders, and more particularly, to portable livestock feeding methods and devices.

2. Prior Art

Agri-economics has become of critical importance in recent years. This is particularly true of the beef cattle industry, but generally applies to all livestock-oriented endeavors. The rancher, dairyman, or the like is continually faced with rising operating costs, while the prices paid for his products have not kept pace. Additionally, the rancher has been unable to take full advantage of "economics of size."

One of the prime reasons for this situation is the necessity of feeding pre-cut, dried fodder or hay to the livestock. While the requirements for feeding pre-cut feed are dependent upon climate, almost all locations in the U.S. require that cattle and other livestock be fed at least part of the year. In northern states, such as Wyoming and Montana, feeding may be required as much as nine months of the year.

Feeding is a costly and time-consuming operation. The economics of, for example, the beef cattle industry could be greatly improved if the manpower required in performing the feeding task and/or the amount of waste normally associated with feeding could be minimized.

Attempts to minimize the manpower required in performing the feeding task by employing large, stationary feeding "pavilions" have generally not met with success. Many such devices have been introduced, such as large feeding troughs, conveyor devices, and the like. However, in general, these devices have had inherent drawbacks. First, many are mechanically complicated, making the use of such devices for the small rancher almost prohibitive in terms of initial purchase as well as maintenance and upkeep. Second, they require that a large number of cattle be fed in a very confined area which leads to sanitary and disease problems. Third, huge quantities of feed are placed in these devices where the cattle, even when restrained by stanchions, have almost unrestrained access to the loose fodder. Thus the feeding cattle broadcast or spill or otherwise dump a large fraction of the feed on the ground where it is trampled and soiled. The trampled and soiled feed cannot be eaten and is therefore wasted. Thus, most large installations waste a large percentage of the fodder purchased.

In addition to the inherent drawbacks, stationary feeding installations also prevent the rancher from taking advantage of natural pasture grass which, although not sufficient to support a total herd at certain times of the year, is ofttimes of sufficient quantity to substantially supplement the pre-cut feed. Thus, in addition to wasting a great deal of the pre-cut feed, more of the feed has to be fed for a longer period of time, when stationary feeding installations are used.

Portable feeding methods and devices are also known. One of the simplest methods involves merely broadcasting or breaking baled hay on the ground. While this method alleviates some problems associates with stationary feeding installations, such as sanitary and disease problems, the waste is enormous.

Small, portable feeding devices have been constructed over the years, but none to date has been totally effective in eliminating waste while still allowing substantially large volumes of feed to be efficiently fed to the livestock. For example, some portable feeding devices provide elevated racks communicating with troughs such that gravity forces the feed contained in the rack into the trough as the animals feed. See, for example, U.S. Pat. No. 329,029 to Dye. Although the rack provides a means for placing greater amounts of feed in the feeder, the troughs still allow the feeding livestock unrestricted access to the feed.

Other attempts involve the use of stanchions to form an elevated periphery around a feeder box to allow the livestock limited access to the feed contained within the box. While these devices sufficiently restrain the cattle from wasting the feed, the volume of accessible feed is small. The animals only have access to that amount of feed which can be reached by extending the length of their necks through the stanchions and down into the trough. Thus, such portable feeders, while diminishing waste, require frequent and costly refilling.

A more recent portable feeding device is disclosed in U.S. Pat. No. 3,802,394 issued to Mahler Apr. 9, 1974. This device incorporates a feeder and a means for wetting the pre-cut feed with a liquid food supplement by dipping restrained feed in a trough of the supplement located below the confined feed. Specifically, this device incorporates a rotatable, volumed chamber, bounded in part by a stationary mesh wall. Loose fodder is placed into the rotatable volume. The volume is then varied by means of hinged, solid partitions which are manually manipulated in angular relationship one to the other. This action simultaneously compacts the feed and urges the feed toward the stationary meshed wall.

While this device allows the cattle limited access to the feed, thus preventing a substantial amount of waste, the volume of feed that can be fed is limited. In addition, the device must be manually manipulated from time to time, to maintain compaction of the feed, thus requiring constant attendance. Additionally, because the solid partitions are hinged about a common axis, confinement of the volume can only be accomplished by rotating the partitions in angular relation, one to the other. Thus, the livestock cannot gain access to a retained residual of feed which remains within the container.

The present invention substantially alleviates the problems associated with heretofore-known portable feeders by allowing livestock continuous, limited access to the outer wall of a large mass of contained, compacted feed until the mass is substantially depleted; while preventing the feeding livestock from obtaining unrestricted access to the feed mass. The method and apparatus of the present invention allows for the substantially waste-free feeding of large quantities of pre-cut feed and preferably baled or compacted feed at virtually any desired location. In addition, the apparatus of the instant invention is economical to maintain, has few moving parts, requires no outside energy source other than the feeding cattle, requires essentially no maintenance, and is virtually indestructible.

SUMMARY OF THE INVENTION

In accordance with the broader aspects of the invention, there is provided at least one movably supported, perforated barrier which forms a confining segment of a mobile container such that the barrier is continuously urged against a volume of feed confined within the container by the action of livestock feeding through the perforated barrier. Thus the feeding livestock have continual, limited access to the outer wall of the feed mass, but are unable to gain unrestricted access to the total volume of feed.

According to one embodiment, the station comprises a roofed, mobile, rectangular-shaped, variable volume hopper, adapted for confining fibrous feed and being formed by a pair of spaced-apart upstanding opposing end walls and at least one rigid, mesh-covered panel movably suspended interior the opposing end walls such that the combined action of gravity and livestock feeding through the mesh urge the suspended panel continuously against the outer wall of confined feed until the confined feed is substantially totally consumed.

In preferred forms of the apparatus, each opposing end wall has fixedly attached thereto at least one sloping track. The rigid, mesh-covered panel is movably suspended on opposing sloping tracks by means of a pair of support rods which are fixedly attached to the upper portion of the panel such that the support rods extend beyond the longitudinal dimension of the panel. Each rod engages one of the opposing tracks by resting on the top surface thereof. Thus suspended, the panel may be articulated outwardly and upwardly in an arc for efficient and expeditious loading of the feeding station.

The method of the invention comprises continuously urging a movably suspended, perforated barrier, having perforations of sufficient size for livestock to secure fibrous feed material therethrough, against a volume of confined fibrous feed material by the combined action of gravity and livestock feeding through the perforated barrier.

BRIEF DESCRIPTION OF THE DRAWINGS

The advantages of the present invention will be readily apparent and appreciated by those of ordinary skill in the art as the same becomes better understood by reference to the following detailed description when considered in connection with the accompanied drawings in which:

FIG. 3 illustrates an end view of the apparatus showing the articulation of the panel for loading;

FIG. 4 illustrates an end view of the apparatus with the panel in its fully articulated and recessed position for loading;

FIG. 5 illustrates preferred means for movably suspending the meshed panels on the sloped track; and FIG. 6 illustrates a top view, with the roof removed, showing the mesh-covered, suspended panels in their extended position as they appear when the feeder is full, and a phantom representation of the panels in their collapsed position as they appear when the feeder has been emptied.

DESCRIPTION OF THE PREFERRED EMBODIMENT

Figure 1:
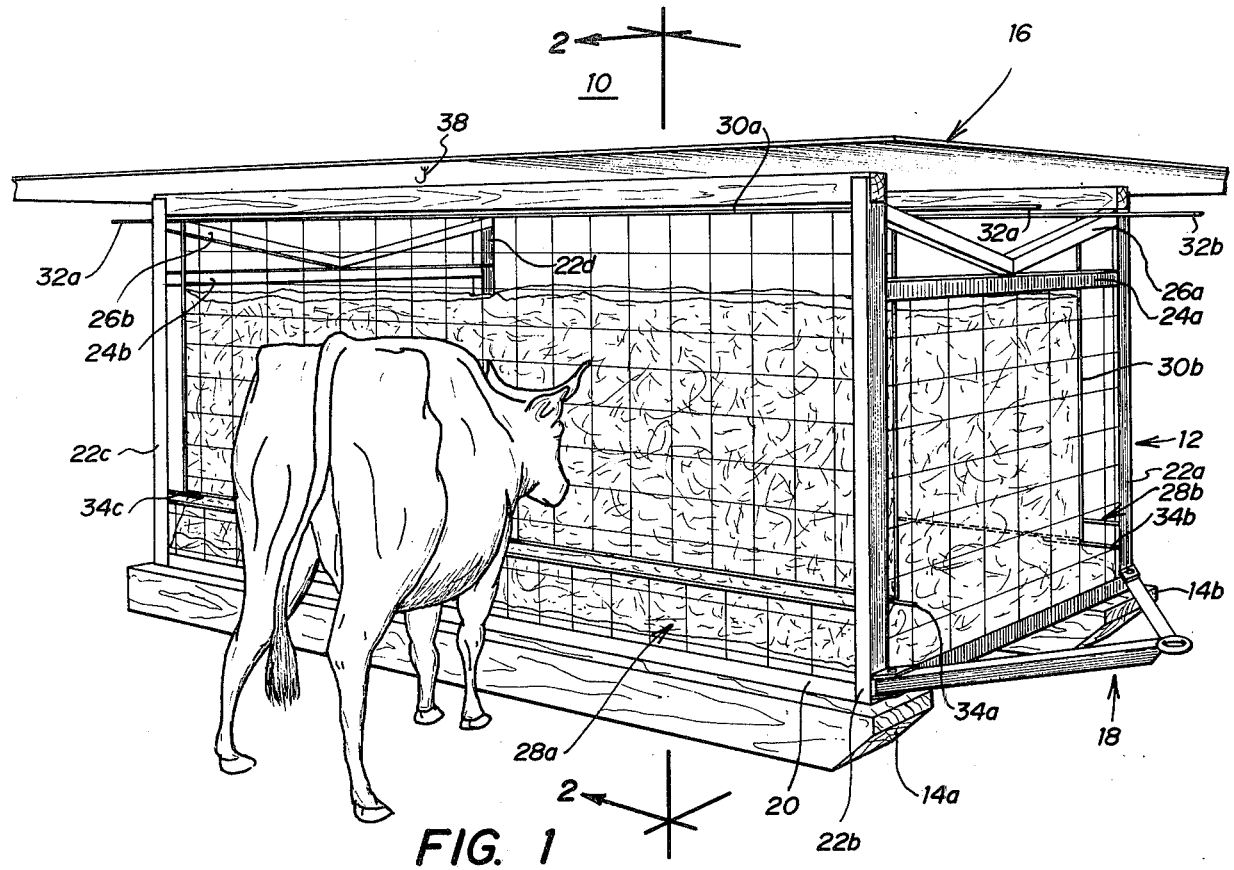
FIG. 1 is a perspective view of a preferred embodiment of the novel portable animal feeding station.

Referring now to the drawings wherein like reference characters designate like or corresponding parts throughout the several views, there is illustrated in FIG. 1 a portable animal feeding station of the present invention. The feeding station, which for purposes of description is generally designated by reference numeral 10, has a mesh-covered, ractangular-shaped variable volume enclosure or hopper 12 which is fixedly supported upon a pair of skids 14a and 14b; and carries, mounted thereon and covering the top portion thereof, a roof 16. A removable pull bar 18 is attached to one end of the hopper 12.

The hopper 12 is formed by a rectangular base plate 20 containing, respectively, fixedly attached at each corner thereof, four upstanding posts 22a, 22b, 22c and 22d. Fixedly attached between upstanding posts 22a and 22b, and 22c and 22d, which form opposing ends of hopper 12, are support members 24a and 24b. Upstanding posts 22a and 22b, support member 24a and the end portion of rectangular base plate 20 form one end wall which is covered with wire mesh. Likewise, upstanding posts 22c and 22d, support member 24b and the other end portion of rectangular base plate 20 form an opposing end wall which is covered with wire mesh. Fixedly mounted between upstanding posts 22a and 22b, and 22c and 22d are v-shaped tracks 26a and 26b, respectively. The apex of v-shaped tracks 26a and 26b are supportedly attached to the center of support members 24a and 24b, respectively.

Fixedly attached to one longitudinal side of base plate 20 and the lower portion of upstanding posts 22b and 22c is a rigid, mesh-covered restraining partition 28a. Likewise, fixedly attached to the opposite longitudinal side of base plate 20 and the lower portion of upstanding posts 22a and 22d is a rigid, mesh-covered restraining partition 28b. The restraining partitions 28a and 28b are of sufficient height to prevent animals entering the confinement, yet not of such a height to restrict consumption of the confined feed. A height of about 18 inches measured from the ground has been found sufficient.

The remaining portion of each longitudinal side of hopper 12 is formed by a pair of movably suspended, articulating, perforated panels 30a and 30b. Each panel 30b and 30b is a rigid, mesh-covered, rectangular frame having elongated dimensions slightly less than the distance between upstanding posts 22b and 22c, and 22a and 22d, respectively; and being of a height such that the bottom longitudinal portion of each panel 30a and 30 b does not contact the upper longitudinal portion of respective restraining partitions 28a and 28b.

Fixedly attached to the upper longitudinal portion of panels 30a and 30b, respectively, are elongated support rods 32a and 32b. The support rods 32a and 32b extend, on each end, substantially beyond the longitudinal dimension of panels 30a and 30b, respectively; and, thus beyond each end wall of hopper 12. The extended portions of each support rod, 32a and 32b, engage the v-shaped tracks 26a and 26b by movably resting on the top surface thereof, as shown in FIG. 5. Thus, each panel 30a and 30b hangs movably suspended, by means of elongated support rods 32a and 32b engaging appropriate portions of opposing v-shaped tracks 26a and 26b.

Restraining pins 34a, 34b, 34c, and 34d (not shown) are slidingly mounted in brackets attached to respective upstanding posts 22 (a–d). The restraining pins slidingly engage the outward facing bottom portion of panels 30a and 30b to restrain the panels from articulating when feeding station 10 is in operation, as will be more particularly described hereinafter.

In operation, the empty feeding station is pulled to an appropriate location in a pasture or the like by means of removable pull bar 18, preferably behind a truck loaded with baled hay or fodder. Once in position, the removable pull bar 18 is removed and one panel (30a or 30b), is articulated upwardly about the appropriate support rod (32a or 32b), as shown in FIG. 3. The panel is then pushed completely back in the direction of arrow 36 and further articulated into a recessed position, as shown in FIG. 4. A latch means 38 is provided on the roof 16 for securely fastening the panel in the recessed position for loading. It will be realized that while both panels are adapted for articulation and positioning for loading, only one panel at a time can assume the recessed position for loading, as shown in FIG. 4.

Baled hay or fodder is stacked either longitudinally or widthwise on the ground within the dimension of the confines of hopper 12. As can be seen in the figures, the total confines, i.e. the width, length, and height dimensions of the feeding station, can be completely filled with compressed fodder or hay. As each bale is placed or stacked within the confines of hopper 12, the baling wire or other restraining feature used to bale the hay is severed. Once the hopper 12 is filled, the articulated panel is unlatched and returned to its hanging position.

Preferably, restraining pins 34 a–d are then positioned to engage the outward facing bottom portion of each panel. Although not critical to the invention, the restraining pins are provided to prevent outward articulation of the movable, suspended panels by feeding livestock. Normally, the panels are of sufficient weight to prevent such articulation and thus the restraining pins are not needed.

Figure 2:
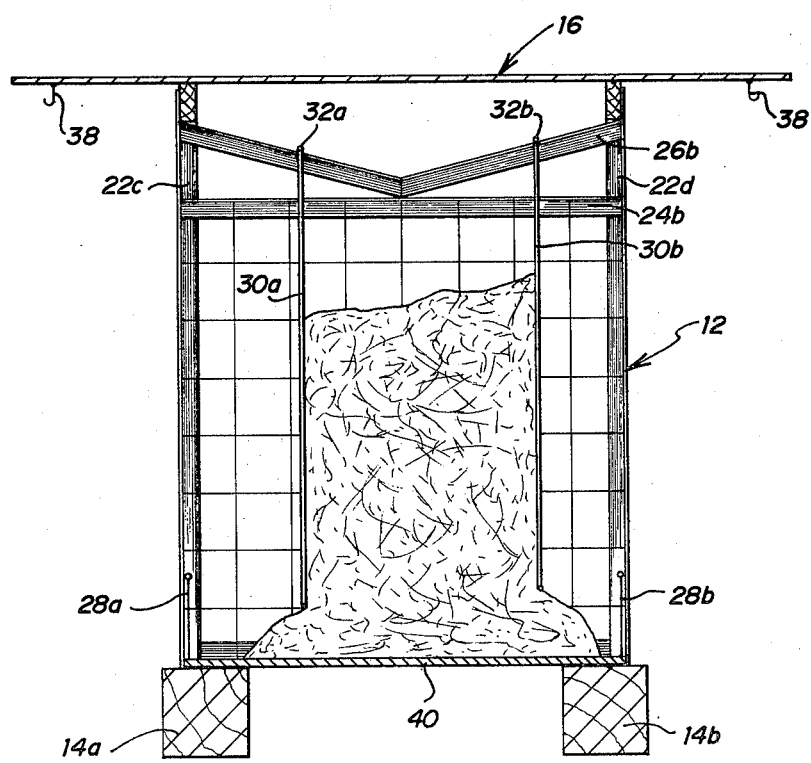
FIG. 2 is a sectional end view of the apparatus taken through 2—2 in FIG. 1.

Once the pins are in place, the filled feeding station is operable. As the cattle feed by pulling the confined feed material through the wire mesh, the panels are continually urged against the remaining wall of the feed in the hopper. As shown in FIG. 2, as the feed is eaten, the panels are urged along the v-shaped tracks 26a and 26b toward the center of hopper 12 and thus toward one another. As a smaller and smaller volume of feed is confined between the panels (30a and 30b), some seepage or spillage can occur underneath the bottom longitudinal portion of each panel. Restraining partitions 28a and 28b prevent the livestock from trampling or soiling this spillage; but, allow the animals to consume this spillage by feeding between the positioned panel and the corresponding restraining partition.

FIG. 5 shows the movement of one end of the elongated support rod 32b along the top surface of the v-shaped track 26b as the animals consume the feed. The sloping configuration of the track utilizes gravity to maintain the panel against the outer wall of feed. Thus, as the livestock feed, urging the movably suspended panel against the outer wall of confined feed, gravity acts on the panel to create a compressive force maintaining the feed in a compact mass between the movably suspended panels. As the feeding station is emptied, the panels progressively move inwardly, finally coming to rest proximate one another in the center of the hopper 12, as shown in phantom in FIG. 6.

The hopper 12 of the instant invention need not contain a floor. Thus, the feed is loaded within the confines of hopper 12 and is supported directly on the ground beneath the confine. In another embodiment, as shown in FIG. 2, the feeding station 10 may employ a floor 40 which is integrally formed as a portion of the hopper 12. In accordance with this embodiment, the hopper 12 can be filled at any location, for example, proximate a hay stack, and moved to a particular location. This embodiment thus alleviates the need for separately transporting the feeding station and the feed to the desired location. Additionally, in accordance with this embodiment, the feeding station may be used to store feed until an apropriate time for use. Thus, it will be realized that the loaded station may be pulled to a desired location and cordoned off, or heavy plastic sheets may be placed over the meshed walls to prevent livestock access to the feed. In this manner, the station provides a convenient device for storing the feed until needed. It should be noted that in accordance with this embodiment, wherein a flooring is provided, the length of the panels and the slope of the tracks must be adjusted such that the panels traveling along the tracks do not at any point engage the flooring, thus stopping the panels from further movement toward the center of the hopper.

The slope of the tracks is not particularly critical; however, preferably the slope is sufficient to urge the panel snugly against the mass of feed. It will be realized by the skilled artisan that the weight of the panel will, to some extent, determine the slope required to gravitationally maintain the panel against the feed. It has been found that tracks having no slope can be utilized in accordance with the invention, since the feeding animals exert sufficient force to urge the panels against the feed without the gravitational force. However, this embodiment is not preferred, since it allows the confined feed a greater opportunity to "mound" of its own weight.

It will be appreciated that the feeding station, as depicted in the figures, is completely symmetrical. However, the feeding station of the instant invention can be configured so as to have only one movable panel. When this is done, the width of the feeding station must be somewhat reduced, since the restraining partition restricts the total movement of the livestock in reaching the feed.

Preferably, the feeding station is completely mesh-enclosed such that cattle have access to the feed from any side, thus allowing more cattle to feed simultaneously without interfering with one another. The movement of the panels and the force of gravity tend to compact the confined feed so that it is urged toward the ends of the feeding station and thus against the inner side of the mesh covering opposing end walls of the hopper. If desired, the end walls of the hopper can be solid partitions or walls to prevent over-exposure of the feed to the elements. The size of mesh openings or perforations for a particular feeding situation will depend upon the livestock to be fed and the feed employed. Generally, the mesh openings should be of sufficient size to allow easy access to the feed material, but not be so large as to allow the animal to pull large quantities of the feed material from the hopper. Preferably, a mesh having a grid opening of about 6 inches square is sufficient when pre-cut, baled hay is used as the feed material. This opening size has been found to allow access to the feed, while providing sufficient restraint to prevent waste.

The material from which the feeding station is constructed is not critical. Any material which is durable and weather-resistant is sufficient. When lighter materials are utilized, however, added weight to the bottom of the hanging panels may be required so that they function normally and cannot be articulated by, for example, an animal grabbing the mesh in its teeth and moving backwards.

The roof is provided totally for convenience. As is well known, the roof prevents feed contained within the feeding station from undue exposure to weather such as rain, snow and the like which hampers the feeding, as well as enhancing spoilage of the feed. Preferably, the roof employs a slight overhang which may be extended to any desired practical length. one of the particularly advantageous aspects of the instant feeding station is that the roof need not be removed in order to load the feeding station. Additionally, the height of the feeding station is preferably such that a man can walk underneath the roof overhang. Thus, even very substantial overhangs will not interfere with either the feeding, loading, or transporting of the station.

It will be noted that the preferred feeding station can be loaded with equal ease from either side. A particularly unique aspect of this invention is the manner in which the panels articulate and then can be forced back and recessed parallel to the roof and latched thereto for loading. In this manner, the roof need not be removed. Additionally, a separate supporting means is not required in order to hold the panel in the articulated position in loading the station. The pull bar 18 is removed prior to allowing the livestock to feed from the station. This is to provide easy access to the feed and prevent the animals from injuring themselves on the protruding bar. A collapsible or retractable bar may also be utilized.

The suspension means may be any known in the art which provides movable suspension of the panel. For example, a u-shaped, "grooved" type track can be utilized with, for example, a mating roller surface which is rotatably connected to the panel by means of bearings, sleeves and the like. Other means for movably suspending the panels will be readily apparent to the skilled artisan. The elongated support rod resting upon the top portion of the track is preferred for simplicity. Additionally, the mechanism requires essentially no maintenance. It has been found that even if the elongated support rod becomes slightly rusted, the pressure of the feeding livestock on the panel is sufficient to cause the panel to move and engage the feed as required. Preferably, the elongated supports extend beyond the tracks, and thus beyond the end of opposing end walls of the hopper, as is shown in detail in FIG. 5. During feeding, the panel can become slightly askew on the tracks because, for example, animals feed at one end of the panel or the other. This condition will quickly right itself. However, the support rods need be of sufficient length to prevent the skewed panel from falling off the track.

The hopper is fixedly mounted on runners or skids to afford mobility of the station. It will be realized by those skilled in the art, any means or method known for transporting large objects may be utilized to afford portability of the station. If advantageous, the feeding station of the instant invention can be permanently mounted on a vehicle having a self-contained motor means.

While the invention has been explained in relation to its preferred embodiments, it is to be understood that various modifications thereof will become apparent to those skilled in the art upon reading the specification and is intended to cover such modifications as fall within the scope of the appended claims.

What is claimed is:

1. A portable animal feeding station comprising:
   mobile support means; and
   a rectangular-shaped, variable volume hopper mounted on said support means and adapted for confining fibrous feed, said rectangular-shaped variable volume hopper comprising a pair of spaced-apart, upstanding, opposing end walls, at least one rigid, perforated side panel having perforations of sufficient size for livestock to pull the feed material therethrough, and means mounted on said end walls for slidably and movably supporting suspension means on said panel such that livestock feeding through said perforations continually urge said panel into said variable volume hopper and against the confined feed material.

2. The portable feeding station of claim 1 wherein said hopper includes:
   a pair of rigid, mesh-covered side panels.

3. The portable feeding station of claim 2 further comprising:
   a roof mounted atop said hopper.

4. The portable feeding station of claim 3 wherein said means for supporting said suspension means comprises a pair of v-shaped sloping tracks mounted interior each opposing end wall; and wherein said suspension means comprises support rods which are fixedly attached to the upper portion of each side panel such that the rods extend beyond the longitudinal dimensions of each panel to engage the top portion of the opposing v-shaped tracks.

5. The feeding station of claim 3 wherein said end walls are mesh-covered such that feeding livestock can pull the confined feed therethrough.

6. A portable feeding station comprising:
   mobile container means for confining a volume of compact, fibrous feed material;
   at least one rigid, perforated barrier adapted to form a confining segment of said container means and having perforations of sufficient size for livestock to pull the feed material therethrough; and
   means on said container for slidably and movably supporting suspension means on said barrier such that livestock pulling the feed through said perforations in said barrier continually urge said perforated barrier into said container means and against the confined feed material.

7. The portable feeding station of claim 6 wherein said means for movably and slidably supporting said barrier comprises sloping means fixedly attached to said container means for movably and slidably supporting said suspension means on said barrier such that the combined action of gravity and livestock feeding through said perforations continually urge said barrier into said container means and against the confined feed such that substantially all of the confined feed can be consumed from the container.

8. The portable feeding station of claim 7 wherein said means comprises a pair of sloped tracks opposingly mounted interior said container means; and wherein said suspension means comprises elongated support rods attached to the upper portion of said barrier and adapted to engage the top portion of said tracks to movably suspend said barrier on said tracks such that said barrier may be articulated upwardly for loading said container.

9. A portable animal feeding station comprising:
   a mobile support means; and a rectangular-shaped, variable volume hopper mounted on said support means and adapted for confining fibrous feed, said rectangular-shaped, variable volume hopper comprising a pair of upstanding, stationary, spaced-apart opposing end walls, a pair of rigid, mesh-covered side panels; and suspension means mounted interior said end walls for movably supporting said panels such that livestock feeding through said panels continuously urge said panels against the confined feed material wherein said suspension means comprise a pair of v-shaped, sloping tracks mounted interior each opposing end wall and support rods which are fixedly attached to the upper portion of each side panel such that the rods extend beyond the longitudinal dimensions of each panel to engage the top portion of the opposing v-shaped track.

10. A portable feeding station comprising: mobile container means for confining a volume of compact fibrous feed material, at least one rigid, perforated barrier adapted to form a confining segment of said container means and having perforations of sufficient size for livestock to pull the feed material therethrough; and means for movably supporting said barrier proximate said container means such that livestock feeding through said perforated barrier continually urge said barrier against the confined feed material by pulling the confined feed therethrough, wherein said means for movably supporting said barrier comprises a pair of sloping tracks opposingly mounted interior said container means and elongated support rods attached to the upper portion of said barrier and adapted to engage the top portion of said tracks to movably suspend said barrier on said tracks such that said barrier may be articulated upwardly for loading said container.

* * * * *